Patented July 31, 1951

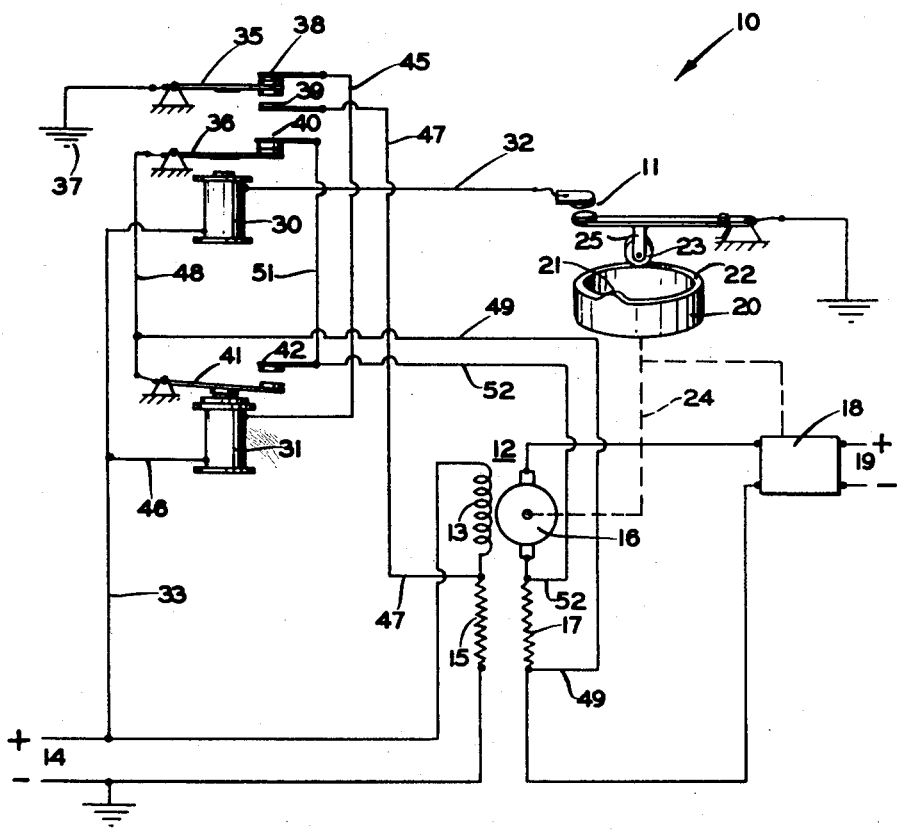

2,562,303

UNITED STATES PATENT OFFICE 2,562,303

REVERSIBLE MOTOR CONTROL CIRCUIT

Adam Drenkard, Jr., Teaneck, N. J., assignor to Bendix Aviation Corporation, Teterboro, N. J., a corporation of Delaware Application May 15, 1948, Serial No. 27,213

4 Claims. (Cl. 318—282)

1

This invention relates to a motor control circuit, and more particularly to a control circuit for a continuously operated motor subject to periodic reversals in operation.

An object of my present invention is to provide a motor control circuit in which the shock of quick reversals in motor operation is cushioned.

Another object of my invention is to provide a motor control circuit in which the rush of armature current is limited during motor reversal by the operation of a relay circuit.

A further object of my invention is to provide a motor control circuit in which the field current of the motor is increased during reversal of motor operation to permit the quick reversal of the motor and the immediate full speed operation thereof in the opposite direction.

Still another object of this invention is to provide a motor control circuit of the general character indicated in which the changes in field and armature current is sequentially timed to permit the full speed operation of the motor up to and after reversal of operation.

A further object of the invention is to provide a motor control circuit of the character indicated which shall be automatic and positive in its operation, relatively inexpensive to manufacture, which shall have a large variety of applications, and yet be practical and efficient to a high degree in use.

Other objects of the invention will in part be obvious and in part hereinafter pointed out.

Referring now to the single figure of the drawing in which one of the various possible illustrative embodiments of this invention is shown, the numeral 10 designates a motor control circuit interconnecting a normally open switch 11 grounded at one end, and a D. C. shunt wound motor 12. The motor 12 comprises a field winding 13 connected across a D. C. voltage supply 14 in series with a field resistor 15 and an armature 16 connected in series with a resistor 17 through a reversing switch 18 to a second source of D. C. supply 19. The armature 16 is adapted to rotate a cam 20 through a suitable reduction gearing herein shown by the dashed line 24. The cam 20 is provided with a raised camming surface 21 on the camming surface 22 of the cam. A cam follower 23 is adapted to roll over the edge 22 of said cam and to roll onto the camming surface 21. The cam follower 23 is fixed to the switch 11 by a suitable link 25 whereby said switch is closed and open upon rotation of the cam 20 by the motor. While only one surface 21 is illustrated, it will be apparent that two camming sur-

2 faces could be provided to close the switch 11, spaced an angular distance apart dependent upon the type of motor control desired. In the illustrated example cam 20 is rotated one complete revolution and then reversed by the operation of the motor.

The operation of the switch 11 will actuate the two relays 30 and 31 shown in the circuit, the relay 31 being of the quick-make, slow-break type. The relay 30 is connected to one terminal of the switch 11 by a lead 32, the other end of the relay coil being connected by a lead 33 to the positive side of the power supply 14. The relay 30 is provided with two switch arms 35 and 36, the switch arm 35 being grounded as at 37. The switch arm 35 normally engages a fixed contact 38, but is adapted upon energization of the relay to disengage said contact and to engage a second fixed contact 39. The switch arm 36 is adapted to engage a fixed contact 40, and disengage the same upon energization of the relay 30. The relay 31 is provided with a switch arm 41 adapted to engage a fixed contact 42 and disengage the same upon energization of the relay.

The fixed contact 38 is connected by a lead 45 to one end of the relay coil 31, the other end of said coil being connected by lead 46 to the lead 33 connected to the plus power supply. The fixed contact 39 of the relay 30 is connected by a lead 47 to a point between the field resistor 15 of the motor and the field 13. The switch arms 36 of the relay 30 and the switch arm 41 of the relay 31 are interconnected by a lead 48 and connected by a lead 49 to one end of the armature resistance 17. The fixed contact 40 and the fixed contact 42 of the relays of 30 and 31, respectively, are interconnected by a lead 51 and thence by a lead 52 to the other end of the armature resistance 17.

In the circuit illustrated in the accompanying drawing, the relay 30 is de-energized by the open switch 11, while relay 31 is energized by the engagement of switch arm 35 and fixed contact 38.

Under the normal operating conditions of the motor 12, the switch 11 will be open due to the cam follower 23 riding over the surface 22 of the cam 20. When the switch 11 is closed by the camming surface 21, the relay 30 will be energized by a circuit which may be traced from the ground connection through the switch and lead 32, through the relay coil 30 and the lead 33 to the positive terminal of the voltage supply 14. The energized relay 30 will close the switch arm 35 and the stationary contact 39 to short the field resistor 15 in the field circuit. Full field current will thus flow through the field winding 13. The time delay relay 31 which had been energized through the switch 35 and contact 38 will be de-energized. The switch arm 41 and the contact 42 will close a short time after relay 31 becomes de-energized. Switch arm 36 and 40 being open by the energized relay 30, and switch arm 41 and contact 42 being open, the short circuit of armature resistor 17 is now open. The resistor is now in the circuit an instant before reversal to limit the inrush of armature current.

The opening of the switch 11 by reverse operation of the motor will break the energizing circuit for the relay 30 and at the same time complete through the de-energized relay 30 the energizing circuit for the relay 31. The de-energization of the relay 30 will open the shorting circuit for the field resistor 15. The current through the field 13 will thus be limited by the resistor in the circuit. By the provisions thus made in limiting the inrush of armature current to the motor and increasing the field strength of the motor field, the reverse operation of the motor will take place at full speed. The cycle is again repeated when the predetermined limit of rotation is reached.

It will thus be seen that there is provided a motor control circuit for a periodically reversed motor in which the several objects of this invention are achieved, and which is well adapted to meet the conditions of partical use.

As various possible embodiments might be made of the above invention, and as various changes might be made in the embodiment set forth above, it will be understood that all matter herein set forth, or illustrated in the accompanying drawings, is to be interpreted as illustrative and not in a limiting sense.

Having thus described my invention, I claim as new and desire to secure by Letters Patent:

1. A control circuit for a reversible motor comprising a switch adapted to be actuated by the operation of the motor at predetermined limits of motor operation at which the motor operation is reversed, means for increasing the field current of the motor upon actuation of said switch, said means including means for limiting the armature current of the motor; and time delay means for limiting momentarily the armature current of the motor after the reversal of motor operation without thereby affecting the flow of field current thereof.

2. A control circuit for a reversible motor comprising a switch, a cam operated by the motor to actuate the switch at predetermined limits of operation at which the motor operation is reversed, a relay operated by the actuation of said switch, a circuit controlled by said relay to increase the field current of the motor upon operation thereof, a second circuit controlled by the operated relay to limit the armature current of the motor, said second circuit including a time delay means for continuing the limitation of armature current momentarily after the operation of the motor has been reversed without thereby affecting the normal flow of field current.

3. A control circuit for a reversible motor, said motor having a resistor in the armature circuit and a resistor in the field circuit thereof comprising a switch, a cam operated by said motor to actuate the switch at predetermined limits of operation at which the motor operation is reversed, a relay operated by the actuation of said switch, contact means controlled by the operated relay to short the field resistor of the motor, a second contact means for said relay shorting the armature resistor of the motor, said second contact means opening upon operation of said relay to insert said resistor in the armature circuit, a time delay relay of the slow release type inoperative upon operation of said first relay and operative upon the inoperativeness of said first relay, contact means controlled by said time delay relay in parallel with the second contact means of said first relay for inserting said resistor into the armature circuit of the motor during the slow release of said relay upon operation thereof upon the inoperation of said first relay.

4. A control circuit for a reversible motor having a resistor in the armature circuit and a resistor in the field circuit thereof comprising a relay, a switch arm, and a first and a second fixed contact for said relay, said second contact connected into the field circuit of the motor to short the field resistor upon engagement by said switch arm, said switch arm normally engaging the first of said contacts and adapted to disengage the same and engage the second of said contacts upon energization of said relay, a relay of the slow release type adapted to be energized by the engagement of said first switch arm and the first contact of the first relay, a switch arm and a fixed contact for the latter relay connected across the armature resistor of the motor, said switch arm normally engaging said contact and adapted to disengage the same upon energization of said relay; and cam means operated by said motor for energizing said first relay and deenergizing the same at predetermined limits of motor operation at which motor operation is reversed.

ADAM DRENKARD, JR.

REFERENCES CITED

The following references are of record in the file of this patent:

UNITED STATES PATENTS

| Number | Name | Date |
| --- | --- | --- |
| 1,584,703 | Penney | May 11, 1926 |
| 1,860,499 | Furnas et al. | May 31, 1932 |
| 2,069,493 | Howe | Feb. 2, 1937 |